(12) United States Patent
Cheikh

(10) Patent No.: US 11,579,324 B2
(45) Date of Patent: Feb. 14, 2023

(54) METHOD FOR DETERMINING THE POSITION OF A METAL OBJECT ON AN INDUCTIVE CHARGING SUPPORT RELATIVE TO A TRANSMITTER ANTENNA AND A RECEIVER ANTENNA

(71) Applicants: Continental Automotive France, Toulouse (FR); Continental Automotive GmbH, Hannover (DE)

(72) Inventor: Mohamed Cheikh, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 396 days.

(21) Appl. No.: 16/643,890

(22) PCT Filed: Sep. 6, 2018

(86) PCT No.: PCT/FR2018/052174
§ 371 (c)(1),
(2) Date: Mar. 3, 2020

(87) PCT Pub. No.: WO2019/048782
PCT Pub. Date: Mar. 14, 2019

(65) Prior Publication Data
US 2020/0271813 A1    Aug. 27, 2020

(30) Foreign Application Priority Data
Sep. 8, 2017 (FR) ..................... 1758285

(51) Int. Cl.
| H02J 50/80 | (2016.01) |
| G01V 3/12 | (2006.01) |
| H02J 50/90 | (2016.01) |
| H02J 50/12 | (2016.01) |
| H02J 50/60 | (2016.01) |

(Continued)

(52) U.S. Cl.
CPC ............... *G01V 3/12* (2013.01); *B60L 53/12* (2019.02); *B60L 53/38* (2019.02); *H02J 7/02* (2013.01);
(Continued)

(58) Field of Classification Search
CPC . G01V 3/12; B60L 53/12; B60L 53/38; H02J 7/02; H02J 50/12; H02J 50/60; H02J 50/80; H02J 50/90
See application file for complete search history.

(56) References Cited

U.S. PATENT DOCUMENTS 10,967,686 B2 *   4/2021  Billy .................. B60C 23/045
2013/0176023 A1 * 7/2013  Komiyama .......... G01R 33/028
                                                              324/258

(Continued)

FOREIGN PATENT DOCUMENTS

EP      3171523 A1    5/2017
WO   2015029370 A1    3/2015

OTHER PUBLICATIONS

International Search Report and Written Opinion for International Application No. PCT/FR2018/052174, dated Oct. 24, 2018, 9 pages.

*Primary Examiner* — Daniel Kessie
*Assistant Examiner* — Brian K Baxter
(74) *Attorney, Agent, or Firm* — RatnerPrestia

(57) ABSTRACT

A method for determining the relative position of a metal object in relation to a user device and to a transmitter antenna of an inductive charging support when charging the user device. The method includes measuring the quality factor of the transmitter antenna, measuring the quality factor of the receiver antenna, and comparing the measured quality factor of the transmitter antenna with a predetermined quality factor threshold of the transmitter antenna and comparing the measured quality factor of the receiver (Continued)

antenna with a predetermined quality factor threshold of the receiver antenna so as to deduce therefrom the relative position of the metal object in relation to the user device and to the transmitter antenna or the absence of an interfering metal object.

6 Claims, 5 Drawing Sheets

(51) Int. Cl.
    *B60L 53/12*     (2019.01)
    *B60L 53/38*     (2019.01)
    *H02J 7/02*     (2016.01)

(52) U.S. Cl.
    CPC .............. *H02J 50/12* (2016.02); *H02J 50/60* (2016.02); *H02J 50/80* (2016.02); *H02J 50/90* (2016.02)

(56) References Cited

U.S. PATENT DOCUMENTS

| | | | | |
|---|---|---|---|---|
| 2014/0077617 | A1* | 3/2014 | Nakano | H02J 50/60 |
| | | | | 307/104 |
| 2014/0125287 | A1* | 5/2014 | Nakano | H02J 50/80 |
| | | | | 307/104 |
| 2015/0028691 | A1* | 1/2015 | Yamauchi | H02J 50/90 |
| | | | | 307/104 |
| 2016/0141882 | A1* | 5/2016 | Ichikawa | H02J 50/60 |
| | | | | 307/104 |
| 2016/0164302 | A1* | 6/2016 | Nakano | H02J 50/80 |
| | | | | 307/104 |
| 2017/0149293 | A1* | 5/2017 | Muurinen | H02J 50/10 |
| 2018/0034509 | A1* | 2/2018 | Nakano | B60L 53/124 |
| 2019/0131826 | A1* | 5/2019 | Park | H02J 50/80 |
| 2020/0271813 | A1* | 8/2020 | Cheikh | H02J 50/90 |

* cited by examiner

METHOD FOR DETERMINING THE POSITION OF A METAL OBJECT ON AN INDUCTIVE CHARGING SUPPORT RELATIVE TO A TRANSMITTER ANTENNA AND A RECEIVER ANTENNA

CROSS REFERENCE TO RELATED APPLICATIONS

This application is the U.S. National Phase Application of PCT International Application No. PCT/FR2018/052174, filed Sep. 6, 2018, which claims priority to French Patent Application No. 1758285, filed Sep. 8, 2017, the contents of such applications being incorporated by reference herein.

FIELD OF THE INVENTION

The invention relates to the field of the inductive charging of a user device, and relates more particularly to a method and a system for determining the relative position of a metal object in relation to a user device and to a transmitter antenna of an inductive charging support when charging said user device.

The invention aims in particular to identify the configuration occupied by the metal object with respect to the user device and the transmitter antenna so as to provide an appropriate response and thus avoid risks.

BACKGROUND OF THE INVENTION

Numerous motor vehicles are nowadays equipped with a charger for inductively charging the battery of a user device. Such a charger may for example be installed in the central console, between the driver's seat and the front passenger seat. The user device may be for example a smartphone, tablet, portable computer, wireless earpiece etc. device.

To this end, the charger comprises what is called a "transmitter" antenna and a support for receiving the user device, installed above said transmitter antenna, and the user device comprises what is called a "receiver" antenna.

When a user wishes to charge his device, he places it on the charging support of the charger, which then detects it via the transmitter antenna. When a user device has been detected, the charger triggers an exchange of messages allowing the device to indicate the power of the charging signal that it wishes to receive. The charger then commands the transmitter antenna so that it transmits a charging signal at the power desired by the user device.

A problem arises when a metal object, for example a coin or an aluminum chewing gum packet, is present on the support when charging the device. Specifically, in this case, some of the power transmitted by the transmitter antenna dissipates into the metal object rather than charging the battery of the user device via the receiver antenna.

Such energy losses may have a significant cost and furthermore lead to the metal object heating up, which may prove dangerous for the user if he comes into physical contact with the object.

In order to partly rectify this problem, it is known to create a power budget in order to estimate the loss level. In this solution, the user device measures the power of the signal that it receives from the transmitter antenna when charging and compares it with the power that it requested beforehand from the charger, the difference constituting the loss level.

When the loss level is greater than a predetermined threshold, it is considered that it is necessary to reduce the power transmitted by the charger, or even to stop the transmitter antenna transmitting the charging signal, so as respectively to reduce or to eliminate the risks linked to the presence of the metal object.

The problem that arises with this solution is that the predetermined threshold depends both on the type of user device (in particular of its receiver antenna), on the type of metal object and on the relative position of the device, of the object and of the transmitter antenna.

More particularly, the threshold is predetermined on the basis of a given type of user device, for example a smartphone of a standard make and model, of a given type of metal object, for example a coin, and of a standard configuration of the assembly formed by the user device, the metal object and the transmitter antenna in which the user device, the metal object and the transmitter antenna are superimposed while being perfectly aligned.

Therefore, depending on the position of the user device in relation to the metal object and the transmitter antenna, the losses will be considered to be great enough only when the user device, the metal object and the transmitter antenna are superimposed while being perfectly aligned, whereas in practice the user device, the metal object and the transmitter antenna may be superimposed without being perfectly aligned, thereby possibly generating more losses, without this triggering the reduction in the power of the charging signal or stopping the transmission of the charging signal.

This is supplemented by another drawback due to the fact that the internal losses of the user device on the basis of which the threshold is predetermined are estimated in the laboratory using a test tool that interacts with the device differently from the charger on board the vehicle, thereby possibly also leading to an incorrect determination of the loss level with respect to the predetermined threshold.

In order to partly rectify these drawbacks, one solution consists in using the quality factor of the transmitter antenna.

More precisely, the user device is calibrated in the factory before the device is marketed, for example in a device certification phase. In this calibration, the user device is deposited on a reference charger and a test device measures the quality factor of the reference transmitter antenna of the reference charger with the user device present on the charging support. This reference value is then stored in a memory area of the user device. Next, when the user device is placed on the charging support of the vehicle, it communicates the reference value of the quality factor of the reference transmitter antenna to the charger. The charger then measures the quality factor of the transmitter antenna when the device is present and compares it to the reference value provided by the device in order to deduce the existence of losses therefrom when the difference between the two quality factor values is greater than a predetermined threshold.

This solution makes it possible to reliably determine the actual loss level when the metal object is aligned with the transmitter antenna, but does not make it possible to cover in particular the configuration in which the metal object is aligned with the receiver antenna of the user device but not with the transmitter antenna, this representing a major drawback. Specifically, in this configuration, the losses through dissipation into the metal object may turn out to be significant and represent a risk of damaging the user device or to the safety of the user.

SUMMARY OF THE INVENTION

An aspect of the invention is a simple, reliable and effective solution that makes it possible to determine the relative position of a user device, of a metal object and of a transmitter antenna of a charger, in particular of a motor vehicle charger, in order to be able to adjust the power level of the charging signal or even to stop the transmission of said charging signal.

An aspect of the invention aims in particular to make it possible to identify the various configurations between the user device, the metal object and the transmitter antenna, in particular the configuration in which the metal object is aligned with the receiver antenna of the user device but not with the transmitter antenna, so as to choose the most appropriate response for each of these configurations in order to reduce the risks of damage for the user while at the same time ensuring effective charging.

To this end, an aspect of the invention relates first of all to a method for determining a position of a metal object, placed on a support of an inductive charging apparatus, in relation to a user device and to a transmitter antenna of said inductive charging apparatus when charging said user device, said user device comprising a battery and a receiver antenna for receiving an inductive charging signal transmitted by the transmitter antenna in order to charge said battery. Said method is noteworthy in that it comprises a step of measuring the quality factor of the transmitter antenna, a step of measuring the quality factor of the receiver antenna, and a step of comparing the measured quality factor of the transmitter antenna with a predetermined quality factor threshold of the transmitter antenna and comparing the measured quality factor of the receiver antenna with a predetermined quality factor threshold of the receiver antenna so as to deduce therefrom a position of the metal object in relation to the user device and to the transmitter antenna or the absence of an interfering metal object.

The method according to an aspect of the invention advantageously makes it possible to easily determine the configuration of the assembly formed by the transmitter antenna of the charging apparatus, the metal object and the receiver antenna so as to choose the best response to make in order to reduce the risks of damage or injury to a user of the vehicle, in particular the risks linked to inductive heating of the metal object. By the same token, the method according to an aspect of the invention makes it possible to reduce losses and heating generated by the presence of a metal object when inductively charging a user device.

Once the configuration has been identified, the method may comprise a step of warning the user of the device about the presence of a metal object on the charging support in particular so that said user moves or removes said metal object so that it is no longer in a position to generate losses by virtue of receiving the charging signal.

According to one feature of an aspect of the invention, it is determined that the receiver antenna, the metal object and the transmitter antenna are aligned when the quality factor of the transmitter antenna is lower than the predetermined quality factor threshold of the transmitter antenna and when the quality factor of the receiver antenna is lower than the predetermined quality factor threshold of the receiver antenna. In this case, as the metal object is substantially centered on the two antennas, the charging support preferably reduces the charging power of the transmitter antenna or temporarily or completely interrupts charging in order to limit the temperature increase in the object.

According to one feature of an aspect of the invention, it is determined that the metal object and the transmitter antenna are aligned with one another but are not aligned with the receiver antenna when the quality factor of the transmitter antenna is lower than the predetermined quality factor threshold of the transmitter antenna and when the quality factor of the receiver antenna is greater than the predetermined quality factor threshold of the receiver antenna. This case is considered to be "the worst-case scenario", because losses are very high due to the high power transmitted by the charging apparatus in order to compensate for the offset with the receiver antenna. As in the previous case, when an object is detected, the charging support reduces the power or temporarily or definitively interrupts charging of the user device.

According to one feature of an aspect of the invention, it is determined that the receiver antenna and the metal object are aligned with one another but are not aligned with the transmitter antenna when the quality factor of the transmitter antenna is greater than the predetermined quality factor threshold of the transmitter antenna and when the quality factor of the receiver antenna is lower than the predetermined quality factor threshold of the receiver antenna. As in the previous cases, when an object is detected, the charging support reduces the power or temporarily or completely interrupts inductive charging.

According to one feature of an aspect of the invention, it is determined that the metal object is not aligned with the receiver antenna or with the transmitter antenna when the quality factor of the transmitter antenna is greater than the predetermined quality factor threshold of the transmitter antenna and when the quality factor of the receiver antenna is greater than the predetermined quality factor threshold of the receiver antenna. This configuration in particular covers the case in which the metal object is too far away from the transmitter antenna and from the receiver antenna and the case in which there is no metal object on the support. In this case, the charging support continues to charge without stopping and is able to adjust the charging power on the basis of the charging state.

According to one aspect of the invention, the method comprises a preliminary step of determining the quality factor threshold of the transmitter antenna.

According to another aspect of the invention, the method comprises a preliminary step of determining the quality factor threshold of the receiver antenna.

An aspect of the invention also relates to an apparatus for inductively charging a user device, intended to be installed in a motor vehicle, said apparatus comprising what is called a "transmitter" antenna and a support for receiving said user device, situated above said transmitter antenna, the user device comprising a battery and what is called a "receiver" antenna for receiving an inductive charging signal transmitted by the transmitter antenna and making it possible to charge said battery. Said charging apparatus is noteworthy in that it is configured so as to measure the quality factor of the transmitter antenna, to measure the quality factor of the receiver antenna, and to compare the measured quality factor of the transmitter antenna with a predetermined quality factor threshold of the transmitter antenna and compare the measured quality factor of the receiver antenna with a predetermined quality factor threshold of the receiver antenna so as to deduce therefrom a position of the metal object in relation to the user device and to the transmitter antenna or the absence of an interfering metal object.

According to one feature of an aspect of the invention, the charging apparatus is configured so as to determine that the receiver antenna, the metal object and the transmitter antenna are aligned when the quality factor of the transmitter antenna is lower than the predetermined quality factor threshold of the transmitter antenna and when the quality factor of the receiver antenna is lower than the predetermined quality factor threshold of the receiver antenna.

According to one feature of an aspect of the invention, the charging apparatus is configured so as to determine that the metal object and the transmitter antenna are aligned with one another but are not aligned with the receiver antenna when the quality factor of the transmitter antenna is lower than the predetermined quality factor threshold of the transmitter antenna and when the quality factor of the receiver antenna is greater than the predetermined quality factor threshold of the receiver antenna.

According to one feature of an aspect of the invention, the charging apparatus is configured so as to determine that the receiver antenna and the metal object are aligned with one another but are not aligned with the transmitter antenna when the quality factor of the transmitter antenna is greater than the predetermined quality factor threshold of the transmitter antenna and when the quality factor of the receiver antenna is lower than the predetermined quality factor threshold of the receiver antenna.

According to one feature of an aspect of the invention, the charging apparatus is configured so as to determine that the metal object is not aligned with the receiver antenna or with the transmitter antenna when the quality factor of the transmitter antenna is greater than the predetermined quality factor threshold of the transmitter antenna and when the quality factor of the receiver antenna is greater than the predetermined quality factor threshold of the receiver antenna.

An aspect of the invention also relates to an inductive charging system, said system comprising a charging apparatus as presented above, a user device positioned on the support of the charging apparatus and a metal object positioned between said user device and said support.

An aspect of the invention relates lastly to a motor vehicle comprising a charging apparatus as presented above.

BRIEF DESCRIPTION OF THE DRAWINGS

Other features and advantages of aspects of the invention will become apparent from the following description, given with reference to the appended figures that are given by way of non-limiting example and in which identical references are given to similar objects.

DETAILED DESCRIPTION OF THE PREFERRED EMBODIMENTS

Figure 1:
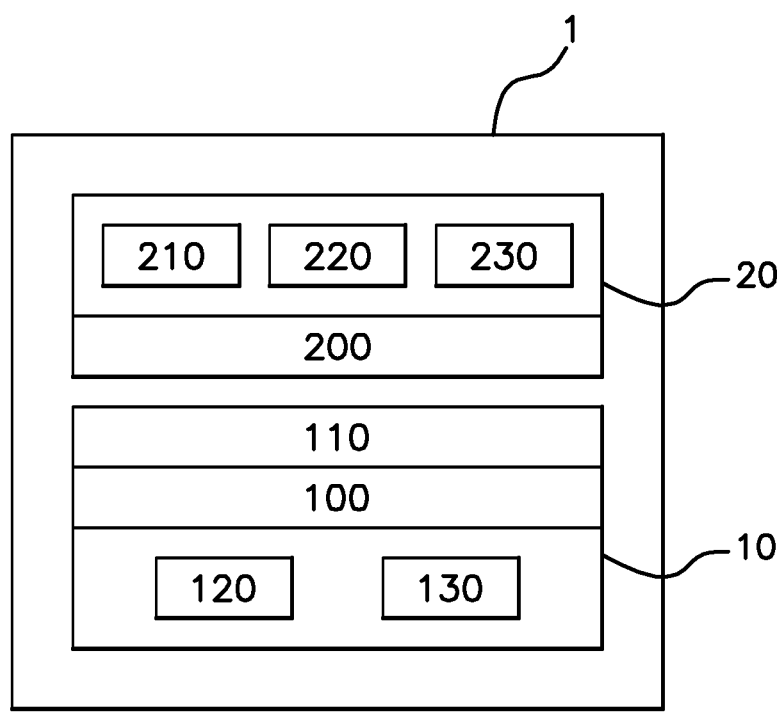
FIG. 1 schematically illustrates one embodiment of the vehicle according to an aspect of the invention.
Figure 2:
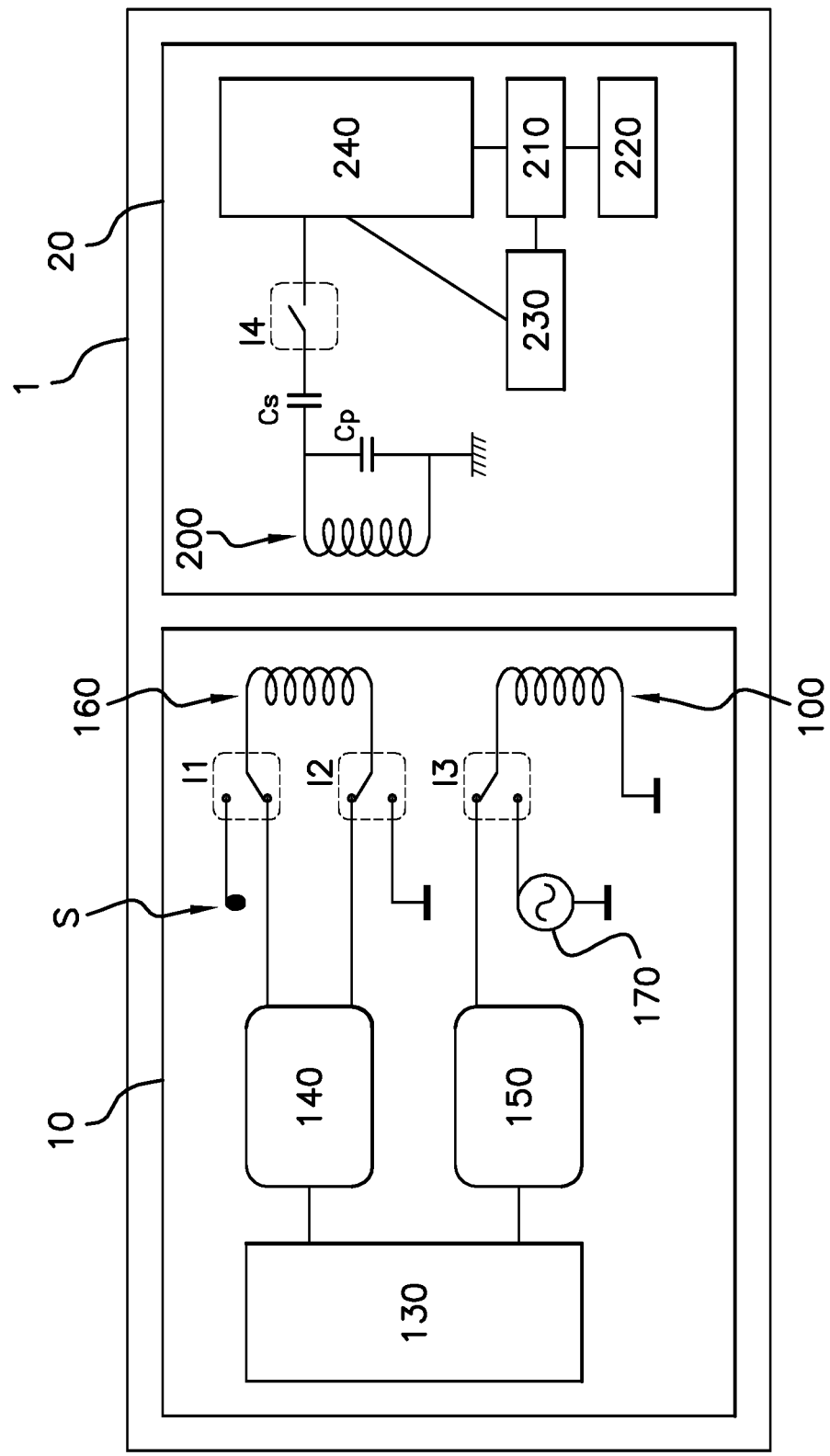
FIG. 2 illustrates an exemplary semi-functional circuit diagram of the vehicle according to an aspect of the invention in a first mode of operation.
Figure 5:
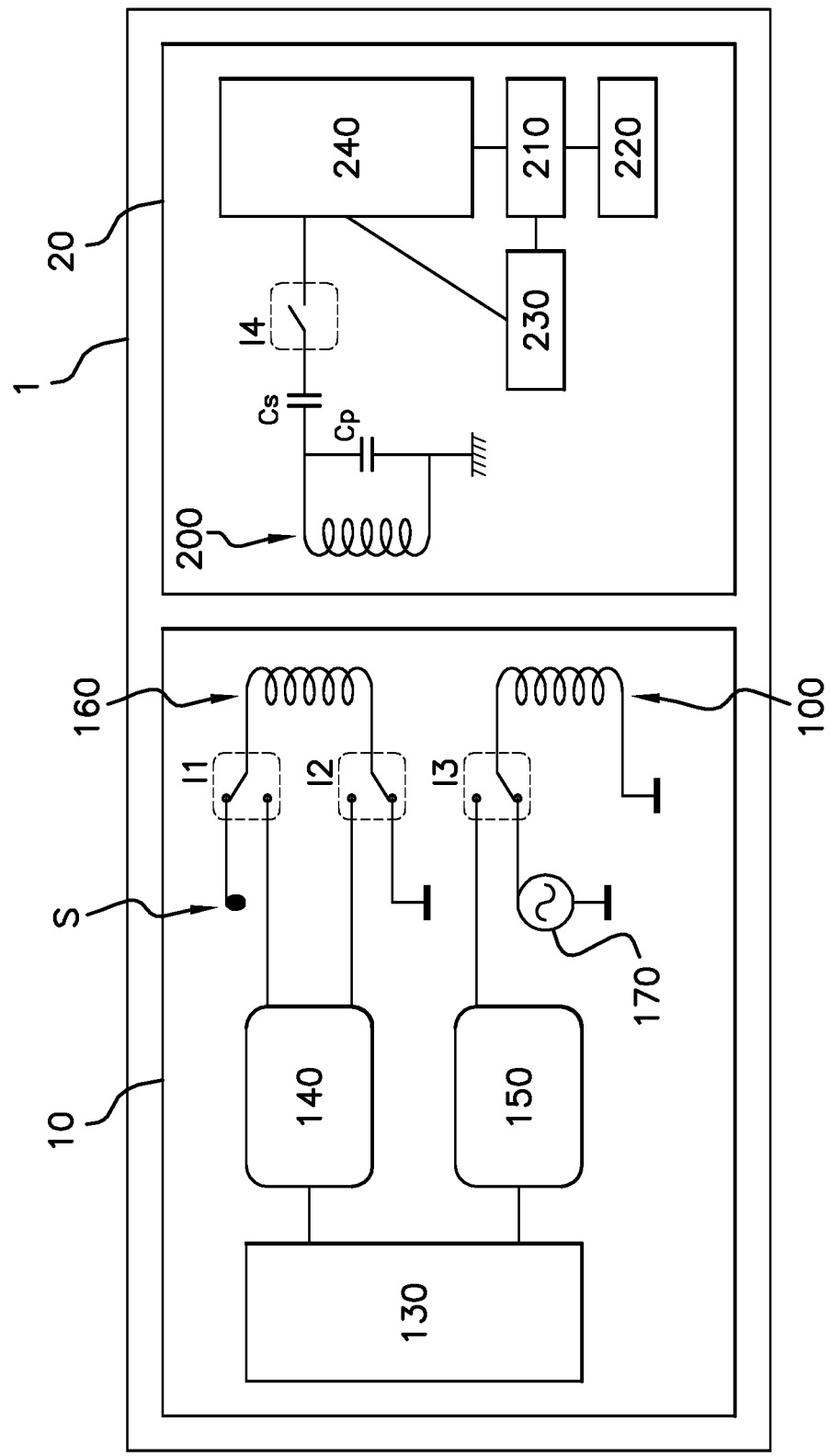
FIG. 5 illustrates the semi-functional circuit diagram of FIG. 2 in a second mode of operation.

FIGS. 1, 2 and 5 schematically show a motor vehicle 1 comprising a charging apparatus 10 (or charger) according to an aspect of the invention. The charging apparatus 10 may for example be installed in the central console, between the driver's seat and the front passenger seat of the vehicle 1. The charging apparatus 10 is an apparatus for inductively charging a user device 20, using for example Qi technology.

The charging apparatus 10 comprises a transmitter antenna 100, a support 110 for receiving a user device 20, installed above said what is called "transmitter" antenna 100 and intended to receive the user device 20 in order to allow it to be inductively charged. In this example, the charging apparatus 10 also comprises a memory area 120 and a processor 130 (or a microcontroller). It will be noted that the memory area 120 and the processor 130 could be external to the charging apparatus 10.

The user device 20 comprises what is called a "receiver" antenna 200, a processor 210 (or a microcontroller), a memory area 220 and a battery 230. The receiver antenna 200 makes it possible to receive an inductive charging signal transmitted by the transmitter antenna 100 of the charging apparatus 10 and making it possible to charge said battery 230.

The terms "transmitter antenna" 100 and "receiver antenna" 200 are understood within the meaning of inductive charging, that is to say that the transmitter antenna 100 transmits the inductive charging signal, this being received by the receiver antenna 200 in order to allow the battery 230 to be charged. However, it goes without saying that the transmitter antenna 100 may also receive signals and that the receiver antenna 200 may also transmit signals, in particular in the context of communication between the charging apparatus 10 and the user device 20 in order for example to configure the transmission power of the charging signal or to exchange data, such as for example the apparatus reference quality factor $Q_0T_X$ and the user device reference quality factor $Q_0R_X$, as will be described below.

The memory area 220 of the user device 20 contains a reference value of a quality factor of the transmitter antenna 100 of a calibration charger (not shown), measured beforehand when the user device 20 was present, for example in the factory in a preliminary calibration process. This reference value, called apparatus reference quality factor, is denoted $Q_0T_X$.

The memory area 220 of the user device 20 also contains a reference value of a quality factor of the receiver antenna 200 said user device 20, measured beforehand on a calibration charger (not shown), for example in the factory in a preliminary calibration process on the model of the user device 20. This reference value, called user device reference quality factor, is denoted $Q_0R_X$.

The memory area 120 of the charging apparatus 10 also contains a value of a quality factor of the transmitter antenna 100 of the charging apparatus 10, measured when the user device 20 is absent from the reception support 110. This reference value, called no-load quality factor of the charging apparatus 10, is denoted $Q_{DC}$.

This no-load quality factor $Q_{DC}$ of the charging apparatus 10 makes it possible to estimate the losses generated by just the charging apparatus 10 during operation thereof, for example due to its internal components. More precisely, the ratio of this no-load quality factor $Q_{DC}$ of the charging apparatus 10 to the no-load quality factor of the calibration charger (denoted $Q_{CC}$) corresponds to the loss percentage of the charging apparatus 10 in the absence of a user device 20. This ratio, called loss factor and denoted K, makes it possible to determine the efficiency of the charging apparatus 10 in comparison with the calibration charger. For example, if, when the charging apparatus 10 is calibrated in the absence of a user device 20, a no-load quality factor $Q_{DC}$ of the charging apparatus 10 of 80 is measured and the no-load quality factor $Q_{CC}$ of the calibration charger is 100, then it is considered that the loss factor of the charging apparatus is (80/100)=0.8, i.e. 80%, that is to say that the charging apparatus 10 generates losses of 20% due to its operation.

The processor 130 of the charging apparatus 10 is configured so as to perform a plurality of tasks. The processor 130 is in particular configured so as to receive the reference quality factor of the apparatus $Q_0T_X$ from the user device 20 and to calculate a quality factor threshold of the transmitter antenna, denoted $ST_X$, from said received reference quality factor of the apparatus $Q_0T_X$ and from the stored loss factor K of the charging apparatus 10.

The processor 130 is configured so as to receive the user device reference quality factor $Q_0R_X$ from the user device 20 and to calculate a quality factor threshold of the receiver antenna, denoted $SR_X$, from said received reference quality factor of the user device and from the stored loss factor K of the charging apparatus 10.

With reference to FIGS. 1 and 2, the processor 130 is configured so as to measure the quality factor of the transmitter antenna, denoted $QT_X$, to measure the quality factor of the receiver antenna, denoted $QR_X$, and to compare firstly the measured quality factor $QT_X$ of the transmitter antenna 100 with the predetermined quality factor threshold $ST_X$ of the transmitter antenna 100, and to compare secondly the measured quality factor $QR_X$ of the receiver antenna 200 with the predetermined quality factor threshold $SR_X$ of the receiver antenna 200 so as to deduce therefrom a position of a metal object 30 in relation to the transmitter antenna 100 and to the receiver antenna 200 or to deduce therefrom the absence of an interfering metal object 30.

With continuing reference to FIGS. 1 and 2, the processor 130 is configured so as to determine that the transmitter antenna 100, the metal object 30 and the receiver antenna 200 are aligned when the measured quality factor $QT_X$ of the transmitter antenna 100 is lower than the predetermined quality factor threshold $ST_X$ of the transmitter antenna and when the measured quality factor $QR_X$ of the receiver antenna 200 is lower than the predetermined quality factor threshold $SR_X$ of the receiver antenna 200.

With continuing reference to FIGS. 1 and 2, the processor 130 is configured so as to determine that the transmitter antenna 100 and the metal object 30 are aligned with one another but are not aligned with the receiver antenna 200 when the measured quality factor $QT_X$ of the transmitter antenna 100 is lower than the predetermined quality factor threshold $ST_X$ of the transmitter antenna 100 and when the measured quality factor $QR_X$ of the receiver antenna 200 is greater than the predetermined quality factor threshold $SR_X$ of the receiver antenna 200.

With continuing reference to FIGS. 1 and 2, the processor 130 is configured so as to determine that the metal object 30 and the receiver antenna 200 are aligned with one another but are not aligned with the transmitter antenna 100 when the measured quality factor $QT_X$ of the transmitter antenna 100 is greater than the predetermined quality factor threshold $ST_X$ of the transmitter antenna 100 and when the measured quality factor $QR_X$ of the receiver antenna 200 is lower than the predetermined quality factor threshold $SR_X$ of the receiver antenna 200.

With continuing reference to FIGS. 1 and 2, the processor 130 is configured so as to determine that the metal object 30 is not aligned with the transmitter antenna 100 or with the receiver antenna 200 when the measured quality factor $QT_X$ of the transmitter antenna 100 is greater than the predetermined quality factor threshold $ST_X$ of the transmitter antenna 100 and when the measured quality factor $QR_X$ of the receiver antenna 200 is greater than the predetermined quality factor threshold $SR_X$ of the receiver antenna 200.

In the embodiment illustrated in FIGS. 2 and 5, the charging apparatus 10 furthermore comprises an RFID (radiofrequency identifier or radio identification) communication circuit 140, operating for example at 13.56 MHz when the charging apparatus 10 uses a near-field communication (NFC) function, an inductive charging circuit 150, an RFID communication antenna 160 (for example an NFC one) and a variable-frequency generator 170. In this example, the point S corresponds to the point at which the voltage or the current is measured on the RFID communication antenna 160.

The charging apparatus 10 also comprises two switching circuits I1, I2 in order to switch between what is called an "NFC communication" mode via the RFID communication antenna 160 and what is called a "measurement" mode in which the processor 130 measures the voltage at the point S in order to estimate the quality factor $QR_X$ of the receiver antenna 200. The charging apparatus 10 also comprises a switching circuit 13 for deactivating the charging mode and activating the variable-frequency generator 170.

Remaining in the embodiment illustrated in FIGS. 2 and 5, the user device 20 comprises a series resonant capacitor Cs, a parallel resonant capacitor Cp, a switching circuit 14 activated only in the event of inductive charging, and a rectifier circuit 240 for transforming the received AC current into a DC current for charging the battery 230.

By way of example, the switching circuits I1, I2, I3 and I4 may take the form of switches, for example implemented by transistors.

Figure 4:
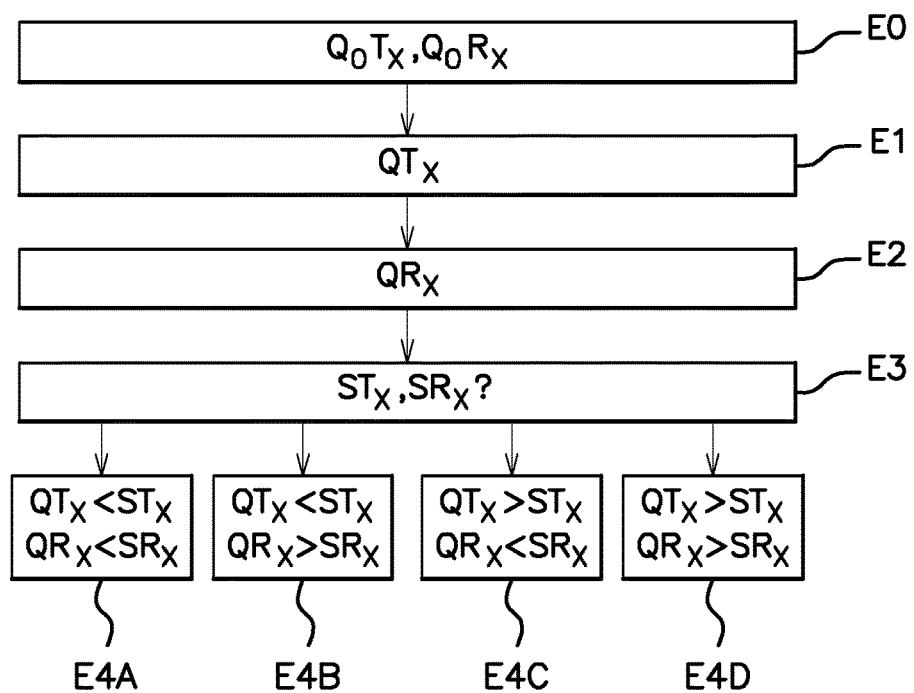
FIG. 4 schematically illustrates one embodiment of the method according to the invention.

An aspect of the invention will now be described in terms of its implementation with reference to the figures, in particular to FIG. 4.

It is considered as a prerequisite that the user device 20 has undergone a test phase beforehand in order to determine its apparatus reference quality factor $Q_0T_X$ and its user device 20 reference quality factor $Q_0R_X$, the values of these two factors being stored in the memory area 220 of the user device 20. It is also considered as a prerequisite that the charging apparatus 10 has undergone a test phase beforehand in order to determine its loss factor K representative of its loss percentage in comparison with the calibration charger.

In a preliminary step E0, the user device 20 communicates its apparatus reference quality factor $Q_0T_X$ and its user device 20 reference quality factor $Q_0R_X$ to the charging apparatus 10, the processor 130 stores the values of these two factors in the memory area 120 of the charging apparatus 10 and calculates a quality factor threshold $ST_X$ of the transmitter antenna 100 and a quality factor threshold $SR_X$ of the receiver antenna 200 on the basis of these values ($Q_0T_X$, $Q_0R_X$) and of its loss factor K, this being described further below. The processor 130 uses these threshold values each time the user device 20 is charged.

It will be noted that the processor 130 may calculate and store values of a quality factor threshold $ST_X$ of the transmitter antenna 100 and of a quality factor threshold $SR_X$ of the receiver antenna 200 for several different types of user device 20 and use the appropriate values depending on the type of user device 20 during charging.

In a step E1, the processor 130 measures the quality factor $QT_X$ of the transmitter antenna 100.

First of all, the switching circuits I1, I2 and I3 are activated in order to connect the RFID communication circuit 140 and the inductive charging circuit 150 to the RFID communication antenna 160 and to the transmitter antenna 100, respectively.

The generator 170 generates a variable-frequency electrical signal so as to be able to measure the signal at the measurement point S. This measured signal corresponds to the frequency image of the resonance of the charging apparatus 10 and of the user device 20, illustrated in FIG. 6.

Figure 6:
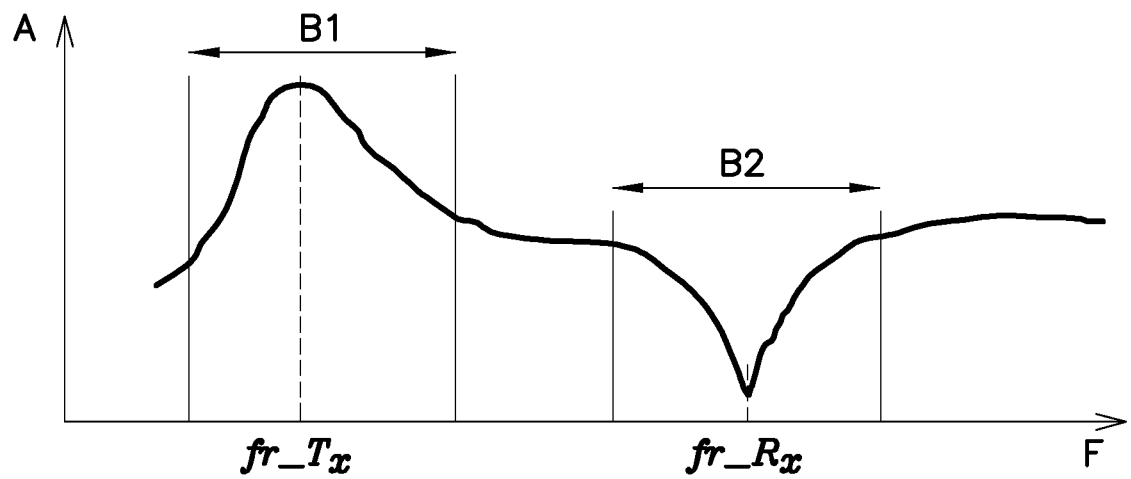
FIG. 6 is an example of the change in the amplitude of the inductive charging signal as a function of frequency.

In this FIG. 6, the frequency band B1, for example [0.02-0.08 MHz], corresponds to the operating band of the transmitter antenna 100 and the frequency band B2, for example [0.7-2.0 MHz], corresponds to the operating band of the receiver antenna 200.

The quality factor $QT_X$ of the transmitter antenna 100 is then calculated from a frequency bandwidth at −3 dB around the resonant frequency $fr\_T_X$ of the transmitter antenna 100 using the following equation:

$$QT_X = \frac{fr\_T_X}{W\_fr\_T_X}$$

where $fr\_T_X$ is the resonant frequency of the transmitter antenna 100 and $W\_fr\_T_X$ is the frequency bandwidth at −3 dB, centered on the resonant frequency of the transmitter antenna 100.

In a step E2, the processor 130 measures the quality factor $QR_X$ of the receiver antenna 200. For this purpose, with the switching circuits I1, I2 and I3 being activated in order to connect the RFID communication circuit 140 and the inductive charging circuit 150 to the RFID communication antenna 160 and to the transmitter antenna 100, respectively, the generator 170 generates a variable-frequency electrical signal so as to be able to measure the signal at the measurement point S. This measured signal corresponds to the frequency image of the resonance of the charging apparatus 10 and of the user device 20.

The quality factor $QR_X$ of the receiver antenna is then calculated from a frequency bandwidth at −3 dB around the resonant frequency $fr\_R_X$ of the receiver antenna 200 using the following equation:

$$QR_X = \frac{fr\_R_X}{W\_fr\_R_X}$$

where $fr\_R_X$ is the resonant frequency of the receiver antenna 200 and $W\_fr\_R_X$ is the frequency bandwidth at −3 dB, centered on the resonant frequency of the receiver antenna 200.

It will be noted that the order of steps E1 and E2 could be swapped or that steps E1 and E2 could be simultaneous.

These steps E1 and E2 thus make it possible firstly to directly measure the quality factor of the transmitter antenna 100 in its operating band B1 and secondly to indirectly measure the quality factor $QR_X$ of the receiver antenna 200 through feedback by sending a variable signal via the RFID communication antenna 160 and by measuring the voltage or the current at the point S in the operating band B2 of the receiver antenna 200.

In a step E3, the processor 130 compares the measured quality factor $QT_X$ of the transmitter antenna 100 with the predetermined quality factor threshold $ST_X$ of the transmitter antenna 100 and compares the measured quality factor $QR_X$ of the receiver antenna 200 with the predetermined quality factor threshold $SR_X$ of the receiver antenna 200 so as to deduce therefrom the relative position of the metal object 30 in relation to the transmitter antenna 100 and to the receiver antenna 200 or the absence of an interfering metal object 30.

More precisely, the processor 130 determines, in a step E4A, that the transmitter antenna 100, the metal object 30 and the receiver antenna 200 are aligned (configuration 1) when the measured quality factor $QT_X$ of the transmitter antenna 100 is lower than the predetermined quality factor threshold $ST_X$ of the transmitter antenna 100 and when the measured quality factor $QR_X$ of the receiver antenna 200 is lower than the predetermined quality factor threshold $SR_X$ of the receiver antenna 200.

The processor 130 determines, in a step E4B, that the metal object 30 and the transmitter antenna 100 are aligned with one another but are not aligned with the receiver antenna 200 (configuration 2) when the measured quality factor $QT_X$ of the transmitter antenna 100 is lower than the predetermined quality factor threshold $ST_X$ of the transmitter antenna 100 and when the measured quality factor $QR_X$ of the receiver antenna 200 is greater than the predetermined quality factor threshold $SR_X$ of the receiver antenna 200.

The processor 130 determines, in a step E4C, that the metal object 30 and the receiver antenna 200 are aligned with one another but are not aligned with the transmitter antenna 100 (configuration 3) when the measured quality factor $QT_X$ of the transmitter antenna 100 is greater than the predetermined quality factor threshold $ST_X$ of the transmitter antenna 100 and when the measured quality factor $QR_X$ of the receiver antenna 200 is lower than the predetermined quality factor threshold $SR_X$ of the receiver antenna 200.

The processor 130 determines, in a step E4D, that the metal object 30 is not aligned with the transmitter antenna 100 or with the receiver antenna 200 (configuration 4) when the measured quality factor $QT_X$ of the transmitter antenna 100 is greater than the predetermined quality factor threshold $ST_X$ of the transmitter antenna 100 and when the quality factor $QR_X$ of the receiver antenna 200 is greater than the predetermined quality factor threshold $SR_X$ of the receiver antenna 200.

Exemplary Implementation

In this purely illustrative example, it is considered as a prerequisite that:
- the no-load quality factor $Q_{CC}$ of the calibration charger is 100,
- the no-load quality factor $Q_{DC}$ of the charging apparatus 10 is 80 (that is to say a loss factor K of 0.8, corresponding to losses of 20%),
- the apparatus reference quality factor $Q_0T_X$ is 70,
- the user device reference quality factor $Q_0R_X$ is 40.

In the preliminary step E0, the charging apparatus 10 receives the values of the apparatus reference quality factor $Q_0T_X$ and of the user device 20 reference quality factor $Q_0R_X$ from the user device 20 and calculates the quality factor threshold $ST_X$ of the transmitter antenna 100 and the quality factor threshold $SR_X$ of the receiver antenna 200 as follows:
- the quality factor threshold $ST_X$ of the transmitter antenna 100 corresponds to the product of the apparatus reference quality factor $Q_0T_X$ and the loss factor K of the user device 20, that is to say in this case: $ST_X=70\times 0.8=56$,
- the quality factor threshold $SR_X$ of the receiver antenna 200 corresponds to the product of the user device 20 reference quality factor $Q_0R_X$ and the loss factor K of the user device 20, that is to say in this case: $SR_X=40\times 0.8=32$.

When the user device 20 is charged on the reception support 110, the processor 130 measures the quality factor $QT_X$ of the transmitter antenna 100 and the quality factor $QR_X$ of the receiver antenna 200 (steps E1 and E2) and compares these two values with their respective threshold $ST_X$ and $SR_X$.

Figure 3:
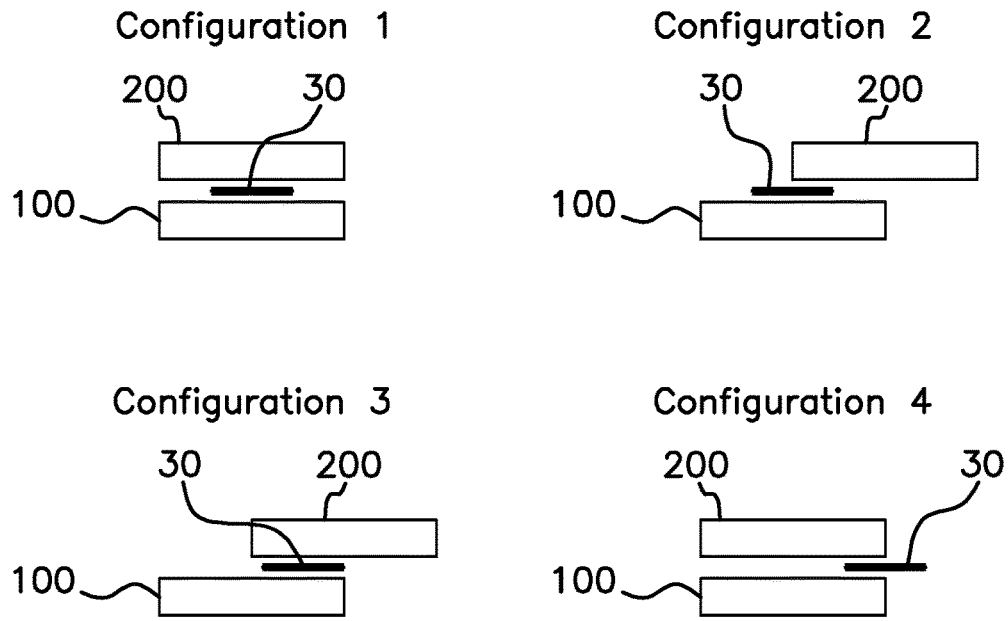
FIG. 3 schematically illustrates an example of the four possible configurations of the assembly formed by the transmitter antenna, the metal object and the receiver antenna.
Figure 7:
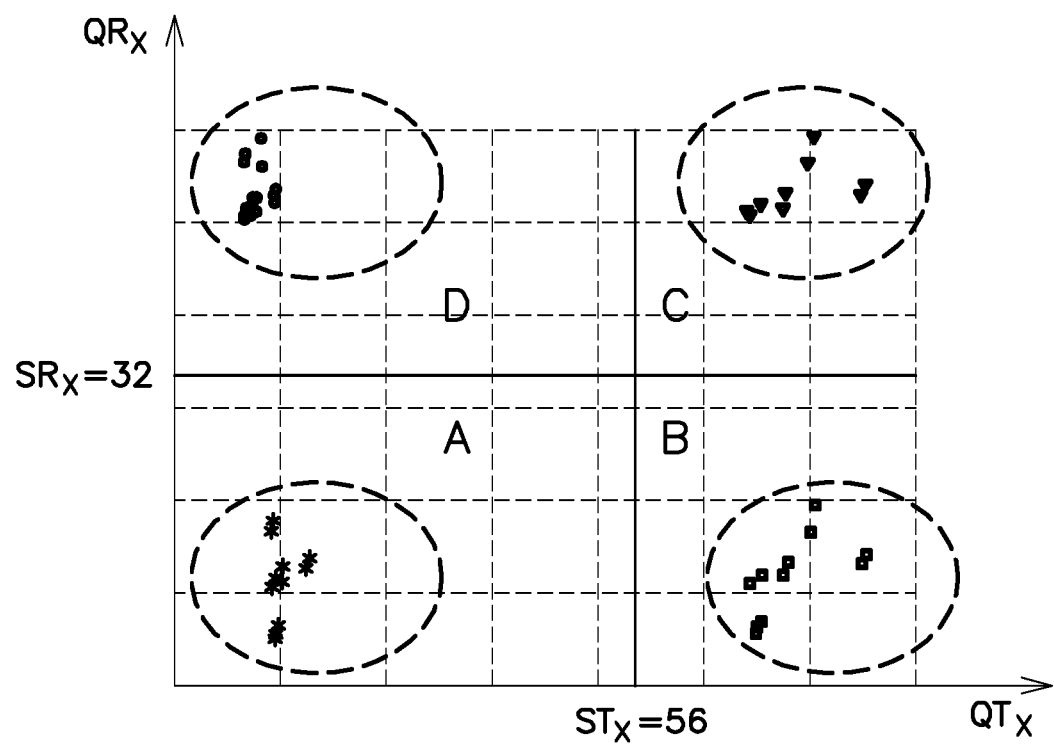
FIG. 7 is a graph showing examples of measurements of the quality factor of the transmitter antenna and of the receiver antenna.

FIG. 7 shows a graph of the quality factor $QR_X$ of the receiver antenna 200 as a function of the quality factor $QT_X$ of the transmitter antenna 100 for the four configurations illustrated in FIG. 3.

For example, if the measured value of the quality factor $QT_X$ of the transmitter antenna 100 is lower than 56 (quality factor threshold $ST_X$ of the transmitter antenna 100) and if the measured value of the quality factor $QR_X$ of the receiver antenna 200 is lower than 32 (quality factor threshold $SR_X$ of the receiver antenna 200), then the processor 130 deduces therefrom that the transmitter antenna 100, the metal object 30 and the receiver antenna 200 are aligned, this corresponding to configuration 1, illustrated in FIG. 3. This corresponds to area A of the graph in FIG. 7.

In this case, the charging apparatus 10 may reduce the charging power or stop charging and signal the presence of a metal object to the user.

If the measured value of the quality factor $QT_X$ of the transmitter antenna 100 is lower than 56 (quality factor threshold $ST_X$ of the transmitter antenna 100) and if the measured value of the quality factor $QR_X$ of the receiver antenna 200 is greater than 32 (quality factor threshold $SR_X$ of the receiver antenna 200), then the processor 130 deduces therefrom that the transmitter antenna 100 and the metal object 30 are aligned with one another but are not aligned with the receiver antenna 200. This corresponds to configuration 2 in FIG. 3 and to area D in FIG. 7. In this case, the charging apparatus 10 may reduce the charging power or stop charging and signal the presence of a metal object to the user.

If the measured value of the quality factor $QT_X$ of the transmitter antenna 100 is greater than 56 (quality factor threshold $ST_X$ of the transmitter antenna 100) and if the measured value of the quality factor $QR_X$ of the receiver antenna 200 is lower than 32 (quality factor threshold $SR_X$ of the receiver antenna 200), then the processor 130 deduces therefrom that the metal object 30 and the receiver antenna 200 are aligned with one another but are not aligned with the transmitter antenna 100. This corresponds to configuration 3 in FIG. 3 and to area B in FIG. 7. In this case, the charging apparatus 10 may reduce the charging power or stop charging and signal the presence of a metal object to the user.

If the measured value of the quality factor $QT_X$ of the transmitter antenna 100 is greater than 56 (quality factor threshold $ST_X$ of the transmitter antenna 100) and if the measured value of the quality factor $QR_X$ of the receiver antenna 200 is greater than 32 (quality factor threshold $SR_X$ of the receiver antenna 200), then the processor 130 deduces therefrom that the metal object 30 is not aligned with the transmitter antenna 100 or with the receiver antenna 200 or is absent from the reception support 110. This corresponds to configuration 4 in FIG. 3 and to area C in FIG. 7.

In this case, the charging apparatus 10 transmits or continues to transmit the power required by the user device 20.

The method according to an aspect of the invention thus makes it possible to easily determine whether a metal object is present on the reception support 110, between the transmitter antenna 100 of the charging apparatus 10 and the receiver antenna 200 of the user device 20, and to specify in which of the four configurations they are positioned in order to take the appropriate measures depending on the configuration, for example reduce the power of the charging signal or else interrupt charging.

The invention claimed is:

1. A method for determining a position of a metal object, placed on a support of an inductive charging apparatus, in relation to a user device and to a transmitter antenna of said inductive charging apparatus when charging said user device, said user device comprising a battery and a receiver antenna for receiving an inductive charging signal transmitted by the transmitter antenna in order to charge said battery, said method comprising:

measuring a quality factor of the transmitter antenna, measuring a quality factor of the receiver antenna, and comparing, during a transmitter quality factor comparison, the measured quality factor of the transmitter antenna with a predetermined quality factor threshold of the transmitter antenna and comparing, during a receiver quality factor comparison, the measured quality factor of the receiver antenna with a predetermined quality factor threshold of the receiver antenna so as to deduce therefrom the position of the metal object in relation to the user device and to the transmitter antenna, and determining that:

the metal object is aligned with both the transmitter antenna and the receiver antenna when the quality factor of the transmitter antenna is lower than the predetermined quality factor threshold of the transmitter antenna and when the quality factor of the receiver antenna is lower than the predetermined quality factor threshold of the receiver antenna, the metal object is aligned with the transmitter antenna and not aligned with the receiver antenna when the quality factor of the transmitter antenna is lower than the predetermined quality factor threshold of the transmitter antenna and when the quality factor of the receiver antenna is greater than the predetermined quality factor threshold of the receiver antenna, the metal object is aligned with the receiver antenna and not aligned with the transmitter antenna when quality factor of the transmitter antenna is greater than the predetermined quality factor threshold of the transmitter antenna and when the quality factor of the receiver antenna is lower than the predetermined quality factor threshold of the receiver antenna, and the metal object is not aligned with the transmitter antenna and not aligned with the receiver antenna when the quality factor of the transmitter antenna is greater than the predetermined quality factor threshold of the transmitter antenna and when the quality factor of the receiver antenna is greater than the predetermined quality factor threshold of the receiver antenna.

2. The method as claimed in claim 1, further comprising a preliminary step of determining the predetermined quality factor threshold of the transmitter antenna.

3. The method as claimed in claim 1, further comprising a preliminary step of determining the predetermined quality factor threshold of the receiver antenna.

4. A charging apparatus for inductively charging a user device, said charging apparatus comprising a transmitter antenna and a support for receiving said user device, situated above said transmitter antenna, the user device comprising a battery and a receiver antenna for receiving an inductive charging signal transmitted by the transmitter antenna and making it possible to charge said battery, the charging apparatus being configured so as to:

measure a quality factor of the transmitter antenna,
measure a quality factor of the receiver antenna, and
compare, during a transmitter quality factor comparison, the measured quality factor of the transmitter antenna with a predetermined quality factor threshold of the transmitter antenna and compare, during a receiver quality factor comparison, the measured quality factor of the receiver antenna with a predetermined quality factor threshold of the receiver antenna so as to deduce therefrom a position of a metal object in relation to the user device and to the transmitter antenna, and determine that:

the metal object is aligned with both the transmitter antenna and the receiver antenna when the quality factor of the transmitter antenna is lower than the predetermined quality factor threshold of the transmitter antenna and when the quality factor of the receiver antenna is lower than the predetermined quality factor threshold of the receiver antenna, the metal object is aligned with the transmitter antenna and not aligned with the receiver antenna when the quality factor of the transmitter antenna is lower than the predetermined quality factor threshold of the transmitter antenna and when the quality factor of the receiver antenna is greater than the predetermined quality factor threshold of the receiver antenna, the metal object is aligned with the receiver antenna and not aligned with the transmitter antenna when the quality factor of the transmitter antenna is greater than the predetermined quality factor threshold of the transmitter antenna and when the quality factor of the receiver antenna is lower than the predetermined quality factor threshold of the receiver antenna, and the metal object is not aligned with the transmitter antenna and not aligned with the receiver antenna when the when the quality factor of the transmitter antenna is greater than the predetermined quality factor threshold of the transmitter antenna and when the quality factor of the receiver antenna is greater than the predetermined quality factor threshold of the receiver antenna.

5. An inductive charging system comprising the charging apparatus as claimed in claim 4, the device positioned on the support of the charging apparatus and the metal object positioned between said user device and said support.

6. A motor vehicle comprising the charging apparatus as claimed in claim 4.

* * * * *